Aug. 16, 1938.    H. E. METCALF    2,126,940
VEHICLE SIGNALING SYSTEM WITH MANUAL OVERRIDE
Filed Oct. 23, 1937
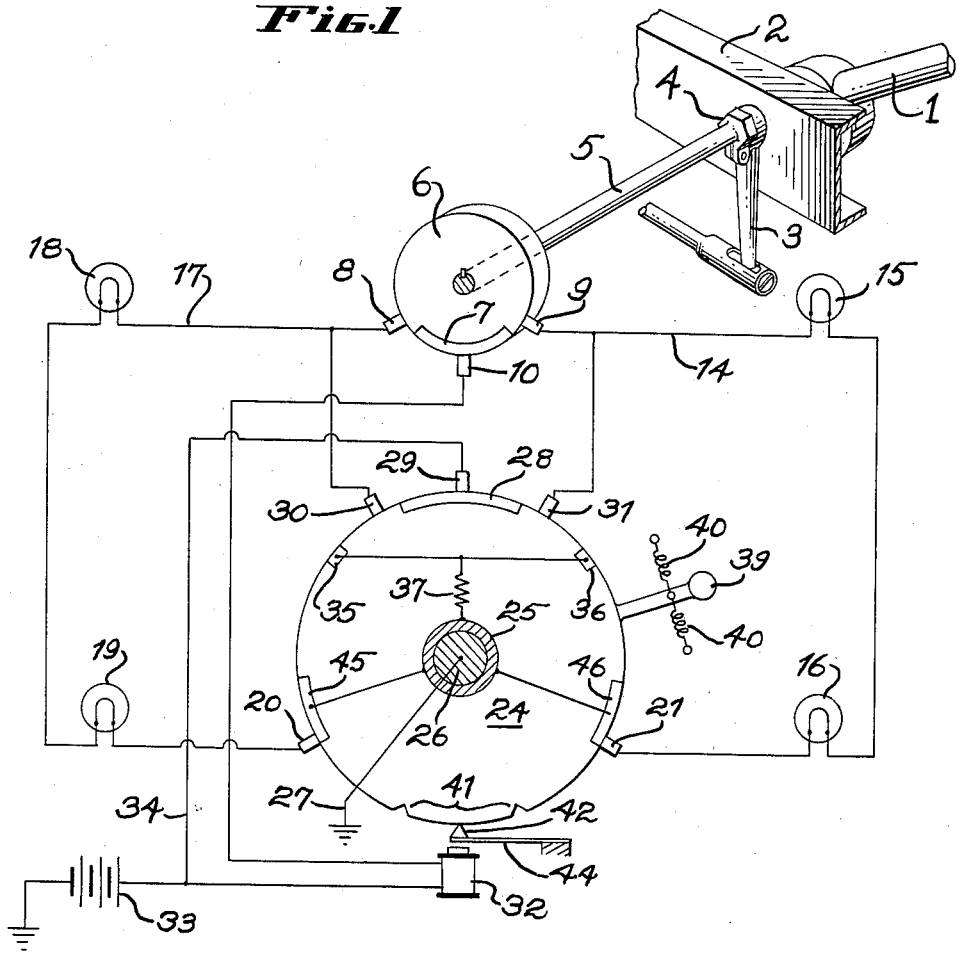
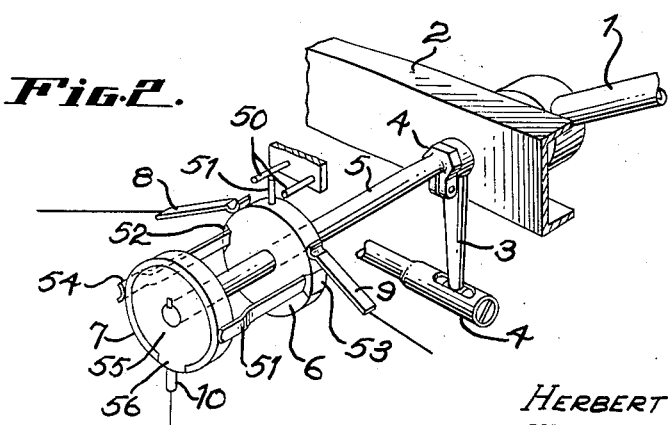
INVENTOR.
HERBERT E. METCALF
BY
Lippincott & Metcalf
ATTORNEYS.

Patented Aug. 16, 1938

2,126,940

UNITED STATES PATENT OFFICE 2,126,940

VEHICLE SIGNALING SYSTEM WITH MANUAL OVERRIDE

Herbert E. Metcalf, Walnut Creek, Calif., assignor to E. H. Kueffer, Oakland, Calif.

Application October 23, 1937, Serial No. 170,611

4 Claims. (Cl. 177—339)

My invention relates to vehicle signaling systems, and more particularly to that type of vehicle signaling system where an automatic switch indicating change of direction is attached to the steering gear, and a manual switch is mounted within reach of the operator in order to set up variations from a predetermined path at the will of the operator, irrespective of the condition of the automatic switch.

The primary object of the present invention is to provide a manual switch and circuit therefor which will ensure that signal devices representing a left and right deviation from a course will never be actuated at the same time. It is of course to be understood that in the present invention signal lamps or lights are merely indicative of a visual signal, and that swinging arms and similar devices are deemed full equivalents.

Among other objects of my invention are: To provide an automatic and a hand switch co-operating to produce a course signal for a vehicle; to provide such a signaling system in which antagonistic signaling devices cannot be operated at the same time; to provide a vehicle signaling system having an automatic and a hand switch, in which the hand switch is able to override the automatic switch, irrespective of the condition of the automatic switch; and to provide a simple and efficient vehicle signaling system which provides for all signaling conditions encountered in piloting a vehicle.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Fig. 1 is a diagrammatic view of a preferred form of hand switch embodying my invention, together with a circuit operating in conjunction with an automatic switch attached to the steering gear. The steering gear switch is shown diagrammatically and in perspective.

Fig. 2 is a diagrammatic perspective view of an alternate form of switch which may be utilized in conjunction with the hand switch and circuit of Fig. 1.

In the application of Clarence B. Howard for United States Letters Patent on a "Vehicle direction indicator", Serial No. 127,112, filed February 23, 1937, and in the application of Wagn Trautner and Herbert E. Metcalf for United States Letters Patent on a "Vehicle signaling and monitoring system", Serial No. 170,828, filed October 25, 1937, there have been shown vehicle signaling systems utilizing a manual switch within reach of the operator, for the purpose of presetting a signal indicating device to show deviation from a predetermined course. In conjunction with the ordinary vehicle, such as an automobile, the signaling devices are grouped in right and left units. In their preferred form, both of the signaling systems above referred to utilize a switch disc frictionally driven from a portion of the steering gear, so that any change from an instant course, irrespective of what that course is, will be indicated. An automatic switch for accomplishing this purpose has been described and claimed in United States Letters Patent on a "Double circuit rotary switch", No. 2,103,287, issued December 28, 1937.

The present invention may utilize either the switch of Howard, as described in the application cited immediately above, or may utilize in an alternate form a simple switch which simply closes a circuit upon deviation from a straight ahead course, and the invention will be described as being applicable to both types of switches. Both of the signaling systems referred to in the first two applications cited above utilize a hand switch for presetting a course when the automatic switch is not in action.

However, there is one condition of operation in the systems referred to where both signaling lamps may be illuminated at the same time, and while this condition will occur only seldom in the use of the device, when it does occur it would be apt to cause confusion in the mind of the pilot of a following vehicle. This condition occurs when the automatic switch has closed the circuit, say, for example, for a right turn, and the vehicle is proceeding on a right turn which is of such an arc that the right turn signal is continuously illuminated. If, then, the driver of such a car wishes to turn left without first straightening out for an appreciable time, the hand switch may be utilized to set up a circuit illuminating the left signal lamp. In both of the first cited applications mentioned above, the hand switch will be able to do this, although the handle will not hold under these circumstances. Nevertheless, the operator of the vehicle may maintain the left signal lamp illuminated by forcefully holding the signal switch in a left position. Up to the time that he straightens out or actually changes his course, however, both signal lamps will be illuminated at the same time, and the value of the signal will be thereby minimized in those particular circumstances.

My present invention therefore embodies a circuit and a particular form of hand switch which will not allow, under any circumstances, both right and left signaling devices to be operated simultaneously, and thus, even though the automatic switch is closed to illuminate a right signal lamp, under the circumstances described immediately above, movement of the hand switch to close the left signal light circuit will at the same time put out the right signal light, thus providing a compete override of the indication set up by the automatic switch. At the same time, the hand switch of my invention does not otherwise change the operation of the indicating devices.

My invention may be more completely understood by direct reference to the drawing, which shows a particular and preferred circuit and structure for practicing my invention.

In Fig. 1 the usual automobile steering gear 1, fastened to the vehicle frame 2, is provided with the customary quadrant arm 3. An automatic switch shaft 5 is attached to the quadrant nut holding the quadrant arm 3 by quadrant nut fitting 4. In this illustration the switch shaft 5 has been greatly elongated for clarity of description.

Mounted on switch shaft 5 is a contact disc 6 having a conductive segment 7 on the periphery thereof, and when the quadrant arm 3 is in central position, lateral brushes 8 and 9 are positioned to bear against the periphery just outside of the conductive segment 7. A common brush 10 bears against segment 7 at all times, and segment 7 is made long enough to remain in contact with common brush 10 over the entire arc of travel of the shaft 5 during the steering of the vehicle.

Right signaling lead 14 goes to right signaling lamp 15 and then through a pilot lamp 16. Left lateral brush 8 is connected through lead 17, through left signaling lamp 18, and thence through pilot light 19. In the ordinary switch set up of this sort, as described in the two first mentioned applications cited above, the circuit is grounded after the current passes through the pilot light. However, in the present case, after passing through the pilot lights 18 and 19, lead 17 runs to grounding brushes 20 and 21 on the periphery 22 of a hand switch disc 24. This hand switch disc has a conductive bushing 25 bearing on a stationary shaft 26 which is grounded, as indicted by ground symbol 27.

At another point on the periphery of hand switch disc 24 is a hand switch segment 28, contacted by a common hand switch brush 29 and flanked by hand switch lateral brushes 30 and 31. Common brush 10 on the automatic switch attached to the steering gear is connected to a release coil 32 and thence to one end of a power source 33, the other end of which is grounded. Common brush 29 on the hand switch is connected directly to the ungrounded end of power source 33 by common brush lead 34.

Also on the periphery of hand switch disc 24 are mounted resistor segments 35 and 36, one on the outside of lateral hand switch brushes 30 and 31 respectively. These two segments 35 and 36 are connected together and grounded to bushing 25 through resistance 37.

In order that the hand switch may center itself in a neutral position, a handle 39 is provided on each side thereof with balanced springs 40, the urge of which tends to keep the hand switch in a neutral position and also tends to return the switch disc to that neutral position when turned. In order that the switch may hold in indicating position right and left of the neutral position, holding notches 41 are provided on the periphery of the disc, or in other convenient locations, and a pawl 42, of a shape adapted to enter notches 41 on the periphery of the disc, is urged against the periphery of the disc by pawl spring 44. The pawl 42, or a connected member, is preferably of magnetic material, and release coil 32 is so positioned as to pull pawl 42 out of notches 41 whenever current is passing through release coil 32 to allow centering of the disc.

The operation of the device, as far as the automatic switch is concerned, is as follows: When the steering gear 1 is rotated, disc 6 of the automatic switch will be rotated in synchronism therewith. Either the right or left signaling circuit will be closed, and as an illustration, I will describe the complete circuit of the right signaling circuit, presupposing that the hand switch remains in neutral position.

Current passes from source 33 through release coil 32 and thence to common brush 10, through segment 7 to right lateral brush 9, thence through right indicating lamp 15, and through right pilot light 16 and its grounding brush 21, bearing against the periphery of the hand switch. In the left hand circuit the return is to grounding brush 20. When the hand switch is in neutral position, I provide direct grounding segments 45 and 46 on the periphery of the hand switch disc 24, and position brushes 20 and 21 adjacent one end thereof, so that when the hand switch disc is moved in one direction, the segment moves out from under one brush, but the length of the other segment is such that it is always in contact with the other brush.

However, when the disc is in neutral position, both grounding brushes 20 and 21 are in contact with direct grounding segments 45 and 46. Thus, when the hand switch is not operated, the automatic switch disc 6 will make and break the right and left signal circuits, following the change of course of the vehicle. The only operation which will take place in the hand switch will be the click of the pawl 42 against the core of release coil 32, which, however, does not change the set-up of the hand switch in any way.

In the second condition to be described, we will presuppose that the vehicle is proceeding in a straight-ahead path, and therefore that no circuits are being closed by the automatic switch disc 6. Under these conditions, handle 39 may be moved to the left. When this occurs conductive segment 28 on the hand switch disc 24 completes the contact between common brush 29 on the hand switch and lateral brush 30 on the hand switch, thus lighting left signal lamp 18 and pilot light 19 from source 33 without, however, the current passing through coil 32.

The pawl 42 will also drop into left hand notch 41 and hold the hand switch disc in the left position, as set up. At the same time, however, grounding segment 46 has moved so that grounding brush 21 does not make contact therewith, thus opening up completely the right hand signal circuit, and simultaneously, resistor segment 36 has moved up to make contact with right lateral brush 31 on the hand switch disc. Thus, the left signaling light will remain set up until one of the two circuits controlled by the automatic switch disc 6 is closed.

However, these two circuits are not alike. If the left hand circuit is closed through lateral brush 8 on the automatic switch, current will flow in parallel with the hand switch through release coil 32, pull up the pawl, and allow disc 24 and handle 39 to centralize. If, however, a turn is made to the right, the right hand circuit will be energized, but this circuit does not now include the signaling lamps but includes a resistance 37 which is so designed as to be an equivalent resistance to the resistance of the signal lamp circuit. Thus, the same amount of current will flow through release coil 32 as if the lights were actually illuminated, the pawl will be pulled out of recess 41, and the hand switch will return to neutral position.

The instant that the hand switch returns to neutral position, however, the resistor circuit is opened and the lamp circuit is closed again, so that lamp 15 is instantly illuminated and will remain so as long as the right hand side of the automatic switch remains energized. Thus, in the normal operation of this circuit, right and left signals may be set up while the vehicle is proceeding straight ahead, but the hand switch right and left circuits may be set up by the automatic switch during any turn, and when any circuit is energized by the automatic switch, the hand switch will return to neutral position automatically. Thus, under ordinary conditions the circuit functions in exactly the same manner as the two circuits described and claimed in the two applications first above cited.

Let us then consider the third condition, and that condition is when the vehicle is in, let us say, a right hand turn sufficient to maintain, by means of the automatic switch, right hand signaling lamp 15 and pilot light 16 illuminated; and let us assume that the driver desires, under these circumstances, to set up a left hand signal in order to indicate a sharp left hand turn without first returning to a straight-ahead course.

Inasmuch as the right hand circuit is energized by the automatic switch, obviously current is flowing through release coil 32, and therefore the switch will not hold in contact making position. However, if switch handle 39 be thrown to the left and held there manually, obviously left signaling lamp 18 will be illuminated, but at the same time the current on the right hand side of the circuit will be transferred from right signaling lamp 15 to resistor 37, thus putting out the right hand circuit even though the automatic switch energizes that circuit. Immediately upon making the turn, the hand hold on the manual switch may be let go and the automatic switch will then take up the proper signal for the new condition set up.

Thus, it is impossible, under any circumstances, with the circuit just above described, to illuminate both sides at the same time, and yet I have provided in the place of the signaling device, an equivalent resistor in order that the current through the release coil may be maintained at all proper times, according to the position of the automatic switch disc 6, whether or not the signaling lights are actually illuminated.

In Fig. 2 I have shown a generalized sketch of the Howard switch. This switch differs from the switch described in Fig. 1 in that the switch in Fig. 1 only registers deviation from a straight-ahead path, whereas the Howard switch shown in Fig. 2 always registers change of direction, irrespective of the path when the change is made.

Here, the steering gear 1, frame 2 and parts 3 and 4 are the same as before, and shaft 5 is likewise attached by the same type of fitting 4. In this case, however, there are two contact discs, the disc 6 being frictionally driven from shaft 5 and restricted to a limited arc of rotation by stop pins 50 cooperating with rotating pin 51 mounted on disc 6. Common segment 7 is mounted on a separate disc, and right and left segments 52 and 53 respectively, are mounted to cooperate with right brush 8 and left brush 9 at the limits of the arc of rotation allowed to the disc 6, and segment brushes 54 extend from segments 52 and 53 to contact common segment 7 on the solidly driven disc 55. Common brush 10 is positioned to make contact with common segment 7 around all of the periphery except a short insulating segment 56, which is so positioned with respect to shaft 5 that it prevents any current through the automatic switch when the steering gear is in a straight-ahead position or in a limited arc on each side thereof, to allow for minor variations in course.

The switch is attached in the circuit as described in conjunction with disc 6 in Fig. 1, and there will be no difference in operation except that upon any change of rotation of shaft 5, the right and left signaling circuits are selectively energized in accordance with the change in direction with respect to the straight-ahead course, except for the fact that in the straight-ahead course no current will pass through the switch.

I have thus provided a complete signaling set-up utilizing a particular type of hand switch, which completely prevents both signaling lamps from being illuminated simultaneously, and yet which does not interfere with the operation of the system as a whole at any time.

It will of course be understood that the exact structure of the switches herein described may be changed within the range of equivalents occuring to those skilled in the art, without changing the essence of my invention within the scope of the appended claims.

The following is claimed:

1. In combination, a vehicle signaling system comprising a steering gear switch automatically and selectively energizing a pair of indicator circuits from a power source upon movement of said steering gear, a current consuming indicator in each of said circuits, a hand-switch movable at will of the operator to selectively energize said same circuits, means for holding said hand-switch in the selected position, means actuated by current passing through said automatic switch for releasing said hold, means for automatically returning said hand-switch to neutral position upon release of said hold, and means operating in synchronism with said movement of said hand-switch for substituting a resistance equivalent to the resistance of the indicator not selected in place thereof.

2. In combination, a vehicle signaling system comprising a steering gear switch automatically and selectively energizing a pair of indicator circuits from a power source upon movement of said steering gear, a current consuming indicator in each of said circuits, a hand-switch movable at will of the operator to selectively energize said same circuits, means for holding said hand-switch in the selected position, means actuated by current passing through said automatic switch for releasing said hold, means for automatically returning said hand-switch to neutral position upon release of said hold, and means mounted on said hand-switch for substituting a resistance equivalent to the resistance of the indicator not selected in place thereof.

3. In combination, a vehicle signaling system comprising a steering gear switch automatically and selectively energizing a pair of indicator circuits from a power source upon movement of said steering gear, a current consuming indicator in each of said circuits, a hand-switch movable at will of the operator to selectively energize said same circuits, means for holding said hand-switch in the selected position, means actuated by current passing through said automatic switch for releasing said hold, means for automatically returning said hand-switch to neutral position upon release of said hold, and means operating in synchronism with said movement of said hand-switch for opening the indicator circuit not selected and simultaneously substituting a resistance equivalent to the resistance of the indicator not selected in place thereof.

4. In combination, a vehicle signaling system comprising a steering gear switch automatically and selectively energizing a pair of indicator circuits from a power source upon movement of said steering gear, a current consuming indicator in each of said circuits, a hand-switch movable at will of the operator to selectively and partially complete said same circuits, means for holding said hand-switch in the selected position, means actuated by current passing through said automatic switch for releasing said hold, means for automatically returning said hand-switch to neutral position upon release of said hold, and additional make and break means mounted for operation by motion of said hand-switch completing both indicator circuits when said hand-switch is in neutral position and for leaving one completed and for opening the other when said hand-switch is moved, and additional contact means mounted for operation by motion of said hand-switch for substituting a resistor having a resistance equivalent to the resistance of the indicator in said open circuit and in place thereof.

HERBERT E. METCALF.